Feb. 4, 1930.  L. VON OHLSEN  1,745,519
ELECTRICAL SYSTEM OF DISTRIBUTION
Filed March 14, 1925
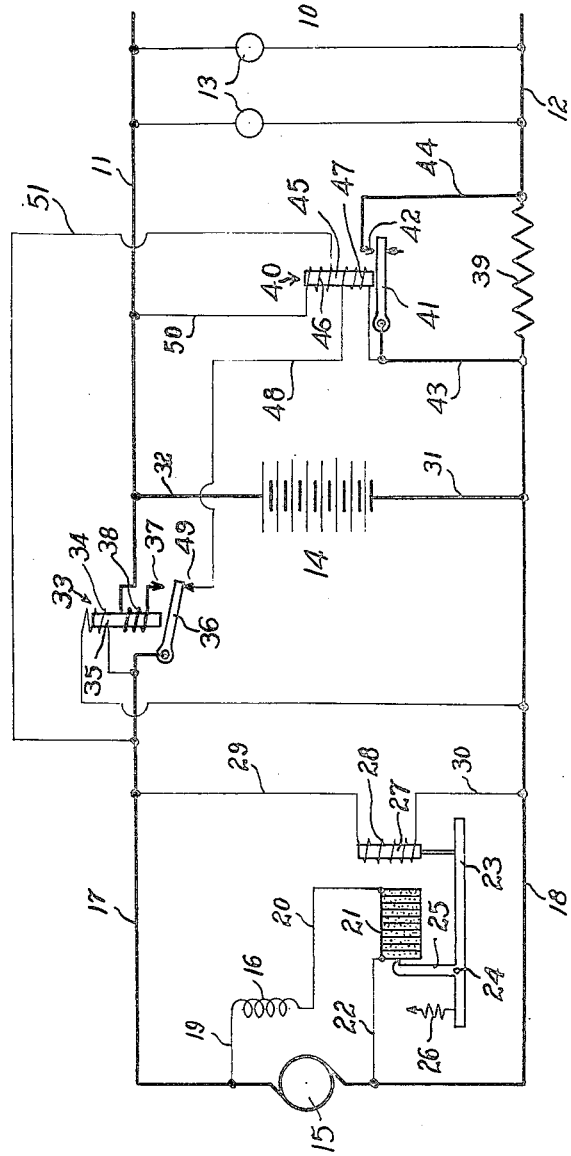
Louis Von Ohlsen  INVENTOR.
BY
Robert S. Blair  ATTORNEY.

Patented Feb. 4, 1930

1,745,519

UNITED STATES PATENT OFFICE

LOUIS VON OHLSEN, OF NEW HAVEN, CONNECTICUT, ASSIGNOR TO THE SAFETY CAR HEATING & LIGHTING COMPANY, A CORPORATION OF NEW JERSEY

ELECTRICAL SYSTEM OF DISTRIBUTION

Application filed March 14, 1925. Serial No. 15,430.

This invention relates to electrical systems of distribution, and more particularly to systems of distribution in which a storage battery, connected to a translation circuit, is arranged to be charged at intervals as by a variable speed generator.

An object of this invention is to provide a system of the above nature which will be simple but thoroughly practical, of dependable operation, and automatic in action throughout. Another object is to provide a system of the above nature which may be embodied in practice in apparatus of few parts, of rugged and simple construction, and at the same time of thoroughly dependable action when in use. Another object is to provide a car lighting system of the above type in which the storage battery may be dependably safeguarded against over-charge, and in which the translation or lighting circuit may be protected in a simple and reliable manner against changes in voltage due to the battery being on charge. Another object is to provide a system of the above type which will be well adapted to meet the hard conditions of practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing there is shown diagrammatically one of various possible embodiments of this invention.

In the accompanying drawing there is generally indicated at 10 a translation circuit to the conductors 11 and 12 of which any desired translating devices may be connected; in a car lighting system, for example, these translating devices will take, for the most part, the form of electric lamps 13 intended to be operated at a substantially constant voltage, thus to maintain the desired degree of luminosity while at the same time to safeguard against the detrimental effects upon the lamps of subjecting them to an abnormally high voltage. The translation circuit 10 and hence the lamps 13 may be supplied with energy from a storage battery 14 connected to the translation circuit. With the battery 14 in a state of charge other than substantial discharge, the lamps 13 may be supplied with energy at substantially the voltage of the battery 14, this voltage throughout the normal range of discharge of the battery varying only within narrow limits.

In order, however, to charge the battery 14, as well as to supplement the action of the latter in carrying the load, imposed by the translation circuit 10, there is provided a generator 15 which may be driven, for example, from one of the axles of the car. The generator 15 will thus partake of variations in speed commensurate with the changes in speed of rotation of the car axle. Conductors 17 and 18 extend from the terminals of the generator 15 and are arranged to be placed in connection with the battery 14 for charging. The field 16 of the generator is connected by conductor 19 to one terminal of the generator 15, and the circuit of the field winding 16 is completed by means of conductor 20, a variable resistance taking the form of a compressible carbon pile 21 and conductor 22, which is connected to the other terminal of the generator 15. Active upon the carbon pile 21 is a lever 23 pivoted as at 24 and having a vertically extending arm 25 arranged to bear against the unanchored end of the carbon pile 21. A spring 26 acts upon the lever 23 so that the latter through the arm 25 tends to compress the carbon pile 21 and thus decrease its resistance.

To the one end of the lever 23 is connected the core 27 of a solenoid, the coil 28 of which is connected as by conductors 29 and 30 across the generator and conveniently to the main line conductors 17 and 18, respectively. The solenoid 27—28 and the spring 26 are so proportioned with respect to one another that the generator voltage will, when the speed of the generator 15 is sufficient, be maintained substantially constant and at such a value that, were the battery 14, when connected to the generator, to be in a state of substantially full charge, the charging current from the generator to the battery will be substantially nil or of relatively small amount, so that substantial over-charge of the battery may be prevented.

One terminal of the battery 14 may be directly connected to the main line conductor 18 as by the conductor 31; the other terminal of the battery 14 is connected as by conductor 32 to the conductor 11 leading to the translation circuit 10. Interposed between the conductor 11 to which the battery 14 is connected and the main line conductor 17 to which the generator 15 is connected, is an automatic switch for completing the connection of the generator to the battery 14; this automatic switch generally indicated at 33 is provided with a generator-voltage responsive coil 34 effective through the core 35 of the switch to lift the switch member 36 into electrical contact with the front contact 37 of the switch 33 as soon as the generator voltage has reached a value appropriate to permit the generator to be connected to the battery. The resultant flow of current from the generator to the battery or translation circuit is effective through the current holding coil 38 on the core 35 to assist the voltage coil 34 in holding the switch member 36 in good electrical contact with the member 37. The closure of the main switch 33 permits the charging of the battery to proceed but inasmuch as the voltage, substantially constant, of the generator 15 is materially higher than the normal voltage imposed by the battery 14 upon the lamps 13, there is interposed between the battery 14 and the lamps 13 a device for preventing the relatively higher generator voltage from affecting the lamps 13 of the translation circuit 10. This device takes the form of a fixed resistance 39 interposed in the conductor 12 and between the lamps 13 and the battery 14. The fixed resistance 39 is thus effective, when the generator 15 tends to impose upon the lamps 13 its relatively high voltage, to cause a potential drop between the battery and the lamps 13, thus to prevent the latter from being affected by the relatively higher voltage of the generator 15 while permitting the generator to charge the battery 14.

The lamps 13 or other devices in the translation circuit 10 may thus continue to function at substantially the normal voltage of the translation circuit even though there is imposed upon the battery 14 the relatively higher voltage of the generator 15.

Should the generator 15, however, have its speed decreased or its voltage diminished, the automatic switch 33 at once opens to prevent the battery 14 from discharging through the generator 15. This disconnection of the generator 15, regulated when above its critical speed for a substantially constant voltage higher than the voltage of the battery 14, thus removes from the battery 14 the relatively high charging voltage, and in order to permit the normal voltage of the battery on discharge to be made effective again upon the translation circuit 10, there is provided a switch generally indicated at 40 for short-circuiting and hence making ineffective the fixed resistance 39. This switch 40 comprises a movable switch member 41 and a coacting contact 42 connected to the terminals of the resistance 39 by the conductors 43 and 44 respectively. The switch member 41 is controlled in its movement by an electromagnetic device including the core 45 about which are made active two coils 46 and 47. The coil 47 is connected to conductor 43 and hence to conductor 18; the other terminal of coil 47 is connected by conductor 48 to a back contact 49 coacting with the switch member 36 of the main switch 33, this switch member 36 being connected to the conductor 17 and hence to the other terminal of the generator 15.

The opening of the main switch 33 thus closes the circuit of coil 47 at the back contact 49 of the main switch; coil 47, being thus energized by generator voltage, closes the switch 40 and holds the switch member 41 in effective electrical contact with the contact 42. The fixed resistance 39 is thus short-circuited and the major portion of the current flowing to the translation circuit 10, which current may be of substantial magnitude, passes through the short-circuiting switch contacts 41—42 of the switch 40. Inasmuch as this current may be of substantial magnitude, the maintenance of a good electrical connection between the members 41 and 42 and under a substantial pressure is highly desirable to prevent arcing and its detrimental effects from taking place at the active parts of the switch 40. The coil 47, energized by generator voltage, insures the holding of the parts 41—42 in good contact one with the other as long as the generator voltage (while the main switch 33 is open) is of substantial value, but the action of the voltage coil 47 is supplemented by the coil 46. Coil 46 is connected as by conductor 50 to conductor 11 and hence to one side of the main switch 33; conductor 51 connects the other terminal of coil 46 to the main line conductor 17 and hence to the other side of the main switch 33.

When the main switch 33 opens, not only is the coil 47 made effective, as at the back contact 49, but also the coil 46, the interconnection electrically of its terminals at the contacts 36—37 of the main switch 33 having been broken upon the opening of the main switch. Hence as the generator voltage decreases, due to further decreases in the speed of the generator, this action resulting in decreasing the effectiveness of the coil 47 of switch 40, the strength of coil 46 increases inasmuch as it is responsive to the difference in voltage between that of the battery and that of the generator. Thus the two coils, as long as the generator 15 is operating at voltages lower than that appropriate to closing the main switch 33, insure the maintenance of a good short-circuiting connection between the switch members 41 and 42; and should the generator 15 be stopped, thus to materially weaken the coil 47, coil 46 now responsive substantially to full battery voltage, is still effective to insure holding the switch 41—42 in good short-circuiting contact.

Should the generator achieve a speed and hence a voltage sufficient to close the main switch 33, coil 47 of the switch 40 will be open-circuited at the back contact 49 of the main switch 33 and coil 46 will be short-circuited at the front contact 37 of the main switch; the switch 40 is thus free to open and will thus be seen to interpose between the translation circuit 10 and the battery 14 the necessary protective resistance 39, as soon as the generator 15 has imposed upon the battery 14 its voltage which is relatively much higher than that of the translation circuit 10. Thus, the translation circuit and its devices are dependably safeguarded against changes in voltage in the system and, as is believed to be clear, the battery 14 will be seen to be dependably protected against over-charge inasmuch as its rise in voltage upon approaching full charge causes the battery voltage to approach that of the generator voltage and to cause hence a tapering off of the charging current to the battery.

It will thus be seen that there has been provided in this invention a system and apparatus in which the several objects hereinbefore noted as well as many advantages are achieved in a thoroughly practical and dependable manner.

As many possible embodiments may be made of the above invention and as many changes might be made in the embodiment above set forth, it is to be understood that all matter hereinbefore set forth or shown in the accompanying drawings, is to be interpreted as illustrative and not in a limiting sense.

I claim as my invention:

1. In apparatus of the character described, in combination, a generator, a storage battery, a translation circuit, an automatic switch interposed between said generator and battery for connecting the generator to the battery upon the former attaining a predetermined voltage, a resistance interposed between said battery and said translation circuit, a switch arranged when closed to reduce the effect of said resistance, a coil responsive to the difference between generator voltage and battery voltage arranged to hold said last-mentioned switch in closed position, and a coil for assisting said last-mentioned coil and responsive to generator voltage when said automatic switch is open.

2. In apparatus of the character described, in combination, a generator, a storage battery, a translation circuit, an automatic switch interposed between said generator and battery for connecting the generator to the battery upon the former obtaining a predetermined voltage, a resistance interposed between said battery and said translation circuit, means adapted to reduce the effect of said resistance, operating means for said last-mentioned means including a coil responsive to the difference between generator voltage and battery voltage and a coacting coil, and means for making said last-mentioned coil ineffective substantially upon the connection of said generator to said battery by said automatic switch.

3. In apparatus of the character described, in combination, a generator, a storage battery, a translation circuit, a switch having a front contact and a back contact and adapted upon operation to connect said generator to said battery at the front contact and to open a circuit at the back contact, a resistance between said battery and translation circuit, a switch arranged when closed to reduce the effect of said resistance, and means in circuit with the back contact of said switch for holding said second-mentioned switch in closed position.

4. In apparatus of the character described, in combination, a generator, a storage battery, a translation circuit, an automatic switch having a front contact and a back contact and adapted upon said generator attaining a predetermined voltage to connect said generator to said battery at the front contact and to open a circuit at the back contact, a resistance between said battery and translation circuit, a switch arranged when closed to reduce the effect of said resistance, means in circuit with the back contact of said automatic switch for holding said second-mentioned switch in closed position, and means controlled by the front contact of said switch for affecting the action of said last-mentioned means.

5. In apparatus of the character described, in combination, a generator, a storage battery, a translation circuit, an automatic switch having a front contact and a back contact and adapted upon said generator attaining a predetermined voltage to connect said generator to said battery at the front contact and to open a circuit at the back contact, means interposed between said battery and said translation circuit for causing a difference in voltage between the battery and said circuit, and electromagnetic means controlled by said back contact of said automatic switch for governing the action of said last-mentioned means.

6. In apparatus of the character described, in combination, a variable speed generator, a storage battery, a translation circuit, means interposed between said battery and said translation circuit for causing a difference in voltage between the battery and said circuit, means responsive substantially to variations in speed of said generator when the latter is operating below a predetermined standard for reducing the effect of said first-mentioned means, and means operative during effective action of said second-mentioned means arranged to supplement the latter but variable in effect substantially inversely with changes in speed of said generator.

7. In apparatus of the character described, in combination, a translation circuit, a storage battery for supplying energy thereto, a resistance interposed therebetween, contact means arranged to short-circuit said resistance, a generator for charging said battery, a switch for connecting said generator to said battery, a coil effective when said switch is open for holding said contact means in short-circuiting position, and means for assisting said coil but ineffective when said switch is closed.

8. In apparatus of the character described, in combination, a translation circuit, a storage battery for supplying energy thereto, a resistance interposed therebetween, contact means arranged to short-circuit said resistance, a generator for charging said battery, a switch for connecting said generator to said battery, a coil responsive to the voltage of the generator when said switch is open for holding said contact means in short-circuiting position, and means for assisting said coil and adapted to increase in effective action as said coil decreases in effective action upon decrease in generator voltage.

9. In apparatus of the character described, in combination, a translation circuit, a storage battery for supplying energy thereto, a resistance interposed therebetween, contact means arranged to short-circuit said resistance, a generator for charging said battery, a switch for connecting said generator to said battery, a coil responsive to the voltage of the generator when said switch is open for holding said contact means in short-circuiting position, and means for holding said contact means in short-circuiting position when the voltage of said generator is nil.

In testimony whereof, I have signed my name to this specification this 4th day of March, 1925.

LOUIS VON OHLSEN.